No. 737,762. PATENTED SEPT. 1, 1903.
J. D. McCABE & W. HANCOCK.
COMBINED SHAFT SUPPORT AND REIN HOLDER.
APPLICATION FILED JUNE 11, 1903.
NO MODEL. 2 SHEETS—SHEET 2.
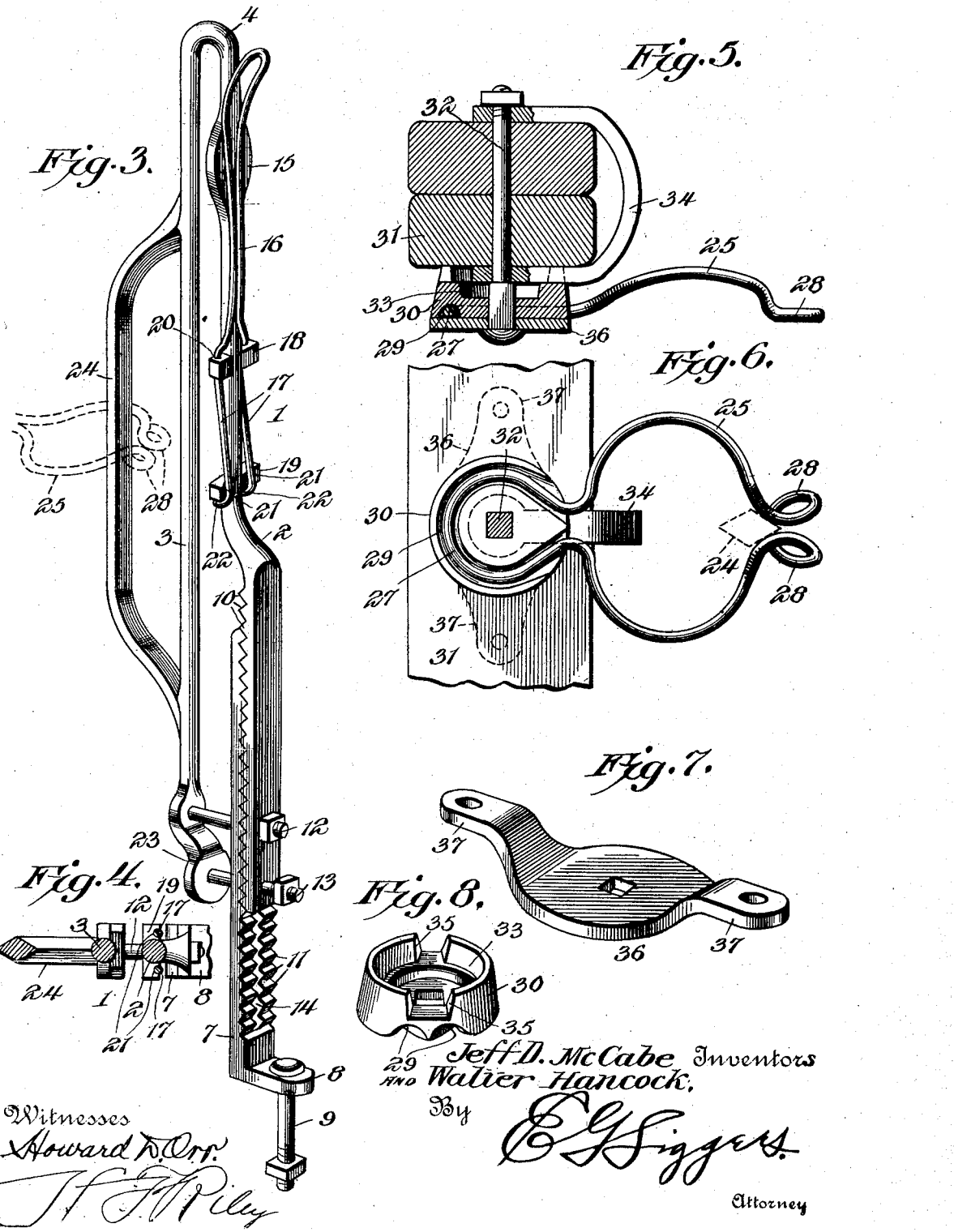

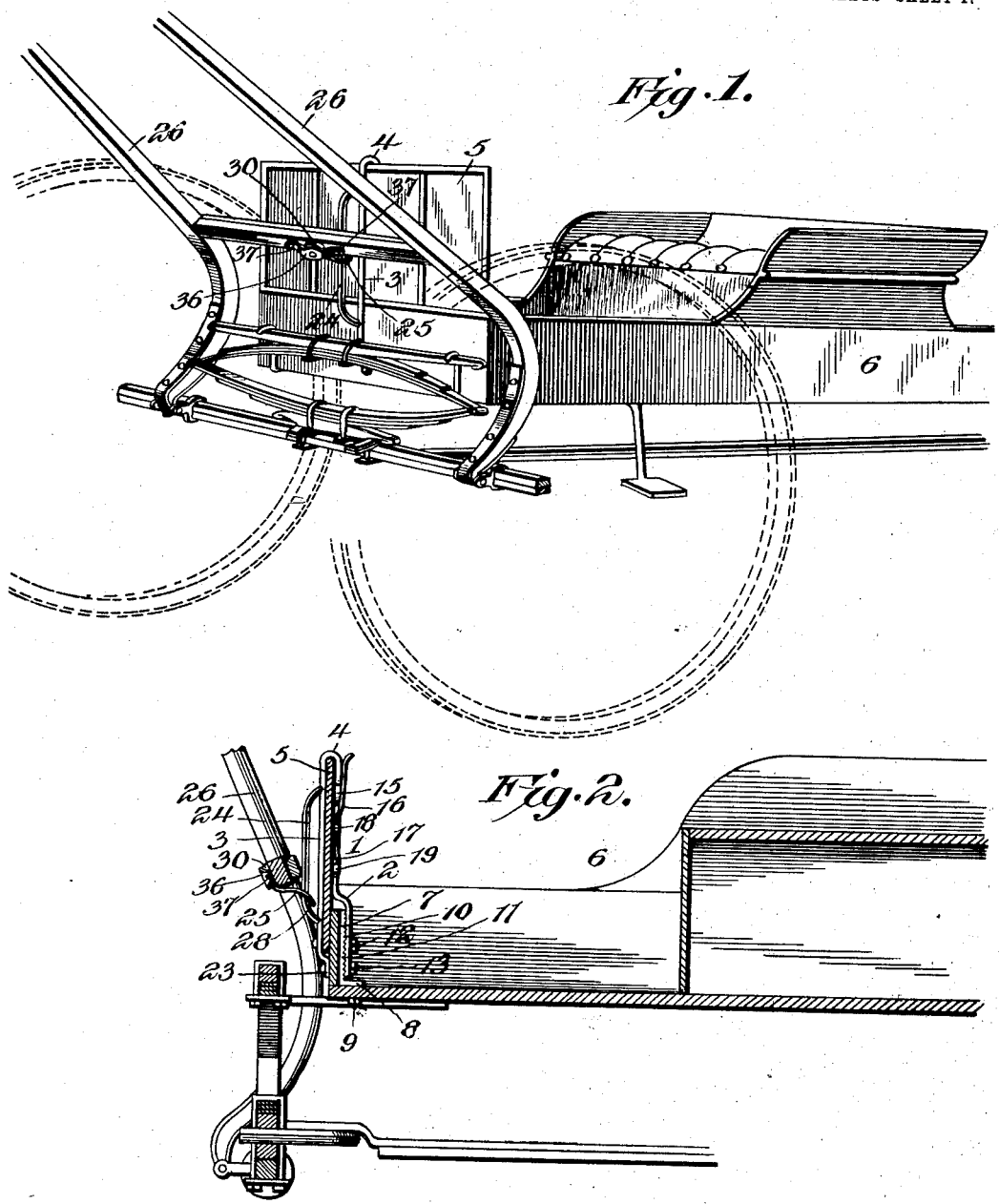

No. 737,762. Patented September 1, 1903.

UNITED STATES PATENT OFFICE.

JEFF D. McCABE AND WALTER HANCOCK, OF WOODBURY, TENNESSEE, ASSIGNORS TO SAID HANCOCK, JAMES THOMAS, AND T. M. BRYAN, OF WOODBURY, TENNESSEE.

COMBINED SHAFT-SUPPORT AND REIN-HOLDER.

SPECIFICATION forming part of Letters Patent No. 737,762, dated September 1, 1903.

Application filed June 11, 1903. Serial No. 161,098. (No model.)

*To all whom it may concern:*

Be it known that we, JEFF D. McCABE and WALTER HANCOCK, citizens of the United States, residing at Woodbury, in the county of Cannon and State of Tennessee, have invented a new and useful Combined Shaft-Support and Rein-Holder, of which the following is a specification.

The invention relates to improvements in shaft-supporters and rein-holders for vehicles.

The object of the present invention is to improve the construction of shaft-supporters and rein-holders, more especially the construction shown and described in Patent No. 687,694, granted to J. D. McCabe the 26th day of November, 1901, and to increase the strength, durability, and efficiency of the construction and to enable the same to be readily adjusted to vehicles having dashboards of different heights.

A further object of the invention is to arrange the shaft-supporting engaging device out of the way and to simplify the same.

Furthermore, the invention has for its object to provide a rein-holder adapted to be readily applied to and removed from the dashboard-brace and capable of firmly clamping the lines and of securely retaining itself in engagement with the supporting-brace.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a combined shaft-support and rein-holder constructed in accordance with this invention and shown applied to a vehicle. Fig. 2 is a vertical sectional view of the same. Fig. 3 is an enlarged detail perspective view of the dashboard-brace and the rein-holder, the engaging spring of the shafts being shown in dotted lines. Fig. 4 is a horizontal sectional view of the same. Fig. 5 is a vertical sectional view through the cross-bar and swingletree, illustrating the manner of mounting the engaging spring of the shafts. Fig. 6 is a reverse plan view of the same, the plate or washer for covering the lower face of the socket being removed. Fig. 7 is a detail view of the bracing-plate or washer. Fig. 8 is a detail perspective view of the socket.

Like numerals of reference designate corresponding parts in all the figures of the drawings.

1 designates a dashboard-supporting brace composed of inner and outer sides 2 and 3, arranged approximately parallel and connected at the top by a bend or transverse portion 4. The brace is adapted to straddle the dashboard 5 of a buggy 6 or other vehicle, and in order to enable it to be readily adjusted to vehicles having dashboards of different heights the inner side 2 is provided with an adjustable section 7, having a perforated lug or foot 8 at its lower end, which is secured by a bolt 9 or other suitable fastening device to the bottom of the vehicle. The lower portion of the inner side 2 is provided at its inner face with a series of corrugations forming transverse teeth 10, adapted to interlock with similar teeth 11 of the section 7, which is maintained in engagement with the lower portion of the inner side of the brace by fastening devices 12 and 13, consisting, preferably, of bolts and passing through the dashboard. The bolts 12 and 13 connect the inner and outer sides of the brace and secure the latter to the dashboard. The lower adjustable section of the inner side of the brace is provided with a longitudinal slot 14 to receive the fastening devices 12 and 13 for permitting the said section 7 to be moved longitudinally of the brace. By this construction the distance between the top of the brace and the lower perforated lug or foot 8 may be readily varied to correspond to the height of the dashboard of a vehicle. The construction also enables the device to be readily applied to a large number of vehicles, and any desired range of adjustment may be provided by varying the length of the adjustable section 7 and the toothed lower portion of the inner side of the brace.

The upper portion of the inner side of the dashboard-brace is laterally enlarged to provide a concave rein-receiving portion 15 for coöperating with a rein-holder 16, consisting of a resilient clamping-jaw and shanks 17. The rein-holder is constructed of a single piece of spring-wire or other suitable material, which is doubled at the center and curved slightly to form the engaging portion or jaw, and the sides of the wire are spread at the lower end of the jaw to form the shanks 17. The upper end of the jaw is curved slightly outward to form a flaring mouth or entrance to facilitate the introduction of the reins between the jaw and the rein-receiving portion 15. The inner side of the dashboard-brace is provided with upper and lower laterally-projecting lugs 18 and 19, arranged in pairs and having notches 20 and 21 at their opposite faces. The notches 20 are arranged at the inner or front faces of the upper lugs and at the rear or outer faces of the lower lugs. The jaw fits against the rear or inner side of the brace above the upper lugs, and the shanks are placed in the notches or seats at the inner or front sides of the upper lugs and are drawn backward and engaged with the lower notches or seats of the lugs 19. This places the resilient jaw under tension and enables the same to firmly clamp the reins. The lower ends of the shanks are curved to form projecting portions or hooks 22 for engaging the lower edges of the lower lugs to prevent the rein-holder from being accidentally pulled upward out of engagement with the lugs when removing the lines from the rein-holder. The rein-holder is readily applied to the rear or inner side of the brace and may be quickly detached, if desired.

The lower end 23 of the front or outer side of the dashboard-brace is bent inward, as shown, to arrange it close to the lower portion of the dashboard and to permit it to fit snugly against the front of the body of the buggy or other vehicle without employing washers or similar spacing devices.

The dashboard-brace is provided at its front side with a bowed outwardly-extending upright shaft-supporting bar 24, approximately diamond-shaped in cross-section and presenting front faces arranged at an angle and diverging rearwardly from the extreme front edge of the bar, whereby it is adapted to be engaged automatically by a clamping-spring 25 of shafts 26 when the latter are swung upward to the position illustrated in Figs. 1 and 2 of the drawings. The bowed shaft-supporting bar operates to brace the front side of the dashboard-brace and to increase the strength of the same. The spring 25, which is constructed of a single piece of stout resilient material, is bent between its ends to form an inner attaching-loop 27, and the material is bent beyond the loop to form approximately semicircular jaws. The terminals of the material are coiled partially at 28 to provide a stiff flaring entrance or mouth to the jaws. The loop 27 is arranged in a lower curved groove 29 of a socket 30, which is secured to the lower face of the cross-bar 31 of the shafts or thills by the pivot-bolt 32 of the swingletree. The groove or channel 29 is approximately circular, terminating at opposite sides of the center of the rear face of the socket, as clearly shown in Fig. 6. The socket is provided at its upper face with a concavity 33 to receive the lower end of a brace 34 of the swingletree. The socket is provided at opposite points with front and rear notches 35, adapted to receive the brace 34. The pivot-bolt 32 passes through the socket-piece and through a bracing-plate or washer 36, arranged on the lower face of the socket-piece to retain the loop of the spring-clamp therein, and the ends 37 of the said plate or washer extend laterally from the socket-piece and are perforated for the reception of bolts or other suitable fastening devices for securing them to the cross-bar 31. The jaws of the spring-clamp extend rearward from the bottom of the cross-bar and are offset from the same and are thereby arranged out of the way, so that there is no liability of the device being accidentally broken. When the shafts are swung upward to the position illustrated in Figs. 1 and 2 of the drawings, the spring-jaws of the clamping device will automatically engage the bowed outwardly-extending upright bar 24 and retain the shafts in such position. The jaws will also automatically release the bar when the shafts are drawn downward with the proper force.

Having thus fully described our invention, what we claim as new, and desire to secure by Letters Patent, is—

1. A device of the class described provided with a dashboard-brace comprising inner and outer sides connected at the top, the inner side being provided at the bottom portion with teeth, and an adjustable lower section having corresponding teeth to interlock with those of the inner side and provided with a foot having means for securing it to the bottom of the body of the vehicle, substantially as described.

2. A device of the class described provided with a dashboard-brace composed of inner and outer sides and adapted to straddle a dashboard, an adjustable section arranged on and extending from the lower portion of the inner side, and provided with means for securing it to the bottom of the body of a vehicle, and fastening means arranged to pierce the sides of the brace and the said section, and securing the latter in its adjustment, substantially as described.

3. A device of the class described provided with a dashboard-brace composed of inner and outer sides and adapted to straddle a dashboard, the inner side having a toothed lower portion, a toothed section interlocked with the lower portion of the inner side and provided with a longitudinal slot and having means for connecting it with the bottom of the body of a vehicle, and a fastening device passing through the inner and outer sides and through the slot of the said section and securing the latter in its adjustment, substantially as described.

4. A device of the class described comprising a dashboard-brace having a rein-receiving portion, and a rein-holder having a jaw coöperating with the said rein-receiving portion, said rein-holder having side portions spaced apart and interlocked with the brace at opposite sides thereof, substantially as described.

5. A device of the class described comprising a dashboard-brace provided with upper and lower lugs projecting from opposite sides of the brace, and a rein-holder composed of a resilient jaw and a pair of shanks spaced apart and interlocked with the opposite faces of the lugs, substantially as described.

6. A device of the class described comprising a dashboard-brace having upper and lower lugs provided with notches or seats located respectively at their inner and outer faces, and a rein-holder consisting of a jaw and a pair of sides or shanks straddling the brace at the upper lugs and arranged in the notches or seats thereof, said shanks being also engaged with the lower notches or seats and having means for engaging the lower lugs to prevent the shanks from being withdrawn accidentally from such engagement, substantially as described.

7. A device of the class described comprising a dashboard-brace provided with an outwardly-bowed upright bar connected at its ends with the brace and presenting front and rear oppositely-disposed angularly-arranged faces, and means designed to be carried by the shafts of a vehicle for engaging the said bar, substantially as described.

8. A device of the class described comprising a socket-piece designed to be mounted beneath the cross-bar of a pair of shafts and provided with an approximately annular groove open at the back of the socket-piece, a clamping-spring provided with a loop arranged in the groove, means for securing the loop in the groove, and means designed to be mounted on the body of a vehicle to be engaged by the spring, substantially as described.

9. A device of the class described comprising a socket-piece provided at its lower face with an approximately circular groove open at the back of the socket-piece, a spring-clamp provided with a loop arranged in the groove, a plate or washer retaining the loop of the spring-clamp in the groove, and means designed to be mounted on the body of a vehicle to be engaged by the spring-clamp, substantially as described.

10. A device of the class described comprising a socket-piece provided with a lower approximately circular groove and having an upper concavity, said socket-piece being also provided with upper notches, a spring-clamp constructed of a single piece of material and provided with a loop arranged in the said groove, a plate or washer covering the groove, and means designed to be mounted on the body of a vehicle for engaging the spring-clamp, substantially as described.

11. A device of the class described comprising a dashboard-brace, a spring-clamp constructed of a single piece of resilient material and designed to be mounted on the cross-bar of a pair of shafts, and means carried by the brace for engaging the spring-clamp, substantially as described.

In testimony that we claim the foregoing as our own we have hereto affixed our signatures in the presence of two witnesses.

JEFF D. McCABE.
WALTER HANCOCK.

Witnesses:
T. G. ROBERTSON,
H. L. MINGLE.